3,079,335
COMPOSITIONS USEFUL IN ADJUSTING THE VISCOSITY AND GEL STRENGTH OF AQUEOUS DRILLING FLUIDS
Arthur G. Clem, Des Plaines, and Ting-Kuo Lee, Chicago, Ill., assignors to American Colloid Company, Skokie, Ill., a corporation of Delaware
No Drawing. Filed Dec. 15, 1960, Ser. No. 75,919
10 Claims. (Cl. 252—8.5)

This invention relates to improved montmorillonite well drilling fluids. More particularly this invention relates to an improved thinner for montmorillonite well drilling fluids and to the production thereof.

In fresh water drilling fluids it is customary to thicken the fluid with clays and similar materials to make the aqueous suspension more viscous so that it will carry cuttings from the hole to the mud settling tank. While increased viscosity is desirable, it is undesirable to have increased gel strength. On the contrary, a low gel strength or thixotropy is desired so that cuttings will settle out in the mud pit from which they can be discharged by jetting into large evaporating ponds. It is common practice to add agents to bentonite well drilling fluids to control viscosity and reduce gel strength. For example, the sodium salt of leonardite has the ability to lower gel strength of bentonite drilling fluids and decreasing the viscosity thereof. The effect of the sodium salt of leonardite is, however, transistory and in as short a period as ten minutes later gel strength has increased perceptively.

It is an object of this invention to provide compositions which are effective in reducing gel strength of montmorillonite drilling fluids. It is another object of this invention to provide drilling fluid compositions of appropriate viscosities which can be pumped efficiently in well drilling operations while suspending well cuttings therein and which have low gel strengths so that the cuttings may settle out and be discharged. It is a further object to provide improved montmorillonite well drilling fluids. These and other objects will be apparent from and are accomplished in accordance with the following disclosure.

We have discovered that water-soluble leonardite in combination with a water-soluble polyphosphate and a water-soluble potassium salt will substantially reduce gel strength, and particularly aged gel strength, without impairing the desired viscosity of montmorillonite well drilling fluids. The combination of water-soluble polyphosphate and water-soluble potassium salt with water-soluble salt of leanardite exerts a substantial beneficial effect on the colloidal properties of aqueous montmorillonite suspensions. Leonardite is a black carbonaceous material related to lignite. It is a form of oxidized lignite consisting mainly of humic acid. Natural leonardite, which normally contains 20% to 50% moisture can be used or it can be ground in an impact mill and dried to less than 20% moisture. Leonardite in its natural form is insoluble in water but is soluble in alkaline solutions. Water-soluble salts can be readily produced by treating leonardite with sufficient aqueous alkali to neutralize the acid radicals and then evavorating the solution to dryness. Soluble forms of leonardite can be also produced by dissolving leonardite in aqueous alkaline solutions, such as solutions of alkali metal polyphosphates shown in the examples.

The polyphosphate which is combined with the leonardite is a soluble salt, such as sodium tetraphosphate, sodium hexmetaphosphate or sodium tripolyphosphate. Combinations of sodium tripolyphosphate and trisodium phosphate have proved equally successful. Other alkali metal polyphosphates may be used, such as potassium pyrophosphate and lithium hypophosphate. Potassium sulfate, potassium chloride, potassium nitrate and potassium ferricyanide are operative as water-soluble potassium salts.

The exact mechanism of the reaction between the alkali metal salt of leonardite and the soluble polyphosphate and potassium salts is unknown. It is possible that potassium salt enters into the clay micelle of the suspended clay solids and forms a semi-illite-bentonite complex with low viscosity, low gel strength and low thixotropic properties. Whatever the mechanism of the reaction is, it is clearly accomplished by the combination of the salts with soluble forms of leonardite.

The compositions which are useful in reducing gel strength while maintaining adequate viscosity of montmorillonite drilling fluids contain 80% to 85% leonardite in the form of a soluble salt, 5% to 10% water-soluble polyphosphate and 5% to 10% water-soluble potassium salt. This combination of salts is more effective than commercial products, such as hemlock bark extracts and ligninsulfonic acid salts which are used commercially to reduce the viscosity of bentonite fresh water drilling fluids, to lower fluid loss of such products and to reduce the gel strength thereof.

By the addition of compositions of this invention it is possible to reduce viscosity of montmorillonite drilling fluids from the range of 60–70 cp. for untreated fluids to 12–30 cp. for treated fluids. It has been found that viscosities of 12–20 cp. are preferred and viscosities as high as 30 cp. are operative in drilling fluids. More important it is possible to reduce initial gel strengths of such fluids from values above 30 grams to values in the range of 0 to 5 grams and to control aged gel strengths so that they do not exceed the range of 5–10 grams. Gel strengths, both initial and aged, should be as low as possible. Gel strengths below 5 grams are desirable but strengths above 10 grams are undesirable.

The invention is disclosed in further detail by means of the following examples which are provided for purposes of illustration only and are not intended to limit the invention in scope. It will be appreciated by those skilled in the art that numerous modifications in quantities of materials, operating conditions and the like may be made without departing from this invention. In the examples, weights of materials are given in kilograms (kilos or kg.), viscosity is given in centipoises (cp.), gel strengths in grams (measured by the standard A.P.I. method), and water loss in milliliters (ml.) (measured by the standard A.P.I. method).

*Example 1*

A series of comparative tests were conducted on a standard fresh water drilling fluid containing 30 kilograms of pulverized sodium bentonite suspended in 350 liters of water. The viscosity, initial strength and 10-minute (aged) gel strength as well as fluid loss were measured on this standard drilling fluid. Then a series of conventional additives were added to identical specimens of standard bentonite drilling fluid and a similar series of measurements made thereon. The results are set forth in the following table:

| Additive | Weight of additive (kg.) | Viscosity (cp.) | Initial gel strength (grams) | 10-minute gel strength (grams) | Water loss (ml.) |
|---|---|---|---|---|---|
| None | | 58 | 30 | 70 | 11.2 |
| Hemlock bark extract | 1 | 24 | 2 | 10 | 11.0 |
| Do | 2 | 21 | 2 | 12 | 10.6 |
| Do | 3 | 22.5 | 2 | 16 | 10.5 |
| Calcium lignin-sulfonate | 1 | 28 | 13 | 25 | 9.7 |
| Do | 2 | 27 | 25 | 25 | 10.8 |
| Do | 3 | 23 | 20 | 25 | 12.0 |
| Sodium leonardite | 1 | 31 | 6 | 40 | 11.6 |
| Do | 2 | 27 | 8 | 40 | 10.8 |
| Do | 3 | 28 | 3 | 38 | 10.7 |
| Leonardite | 1 | 34 | 20 | 45 | |
| Do | 2 | 32 | 8 | 39 | |
| Do | 3 | 30 | 7 | 38 | |

Example 2

The standard drilling fluid consisting of 30 kilos of powdered sodium bentonite suspended in 350 liters of water was treated with an additive of the following composition: 80% leonardite (5% moisture), 10% sodium tripolyphosphate, 5% potassium sulfate and 5% potassium chloride. The effects of this additive on viscosity, initial gel strength, 10-minute gel strength and water loss are shown by the data in the following table:

| Weight of additive (kg.) | Viscosity (cp.) | Initial gel strength (grams) | 10-minute gel strength (grams) | Water loss (ml.) |
|---|---|---|---|---|
| 1 | 25 | 1 | 13 | 11.2 |
| 2 | 20 | 1 | 11 | 10.8 |
| 3 | 20 | 1 | 15 | 10.8 |

Example 3

The standard drilling fluid consisting of 30 kilos of powdered sodium bentonite suspended in 350 liters of water was treated with an additive of the following composition: 85% sodium leonardite (sodium salt of leonardite produced by dissolving leonardite in an equivalent amount of dilute caustic soda solution to pH 9 and evaporating the solution to dryness), 10% potassium sulfate and 5% potassium tripolyphosphate. The viscosity, gel strength and water loss data are presented in the following table:

| Weight of additive (kg.) | Viscosity (cp.) | Initial gel strength (grams) | 10-minute gel strength (grams) | Water loss (ml.) |
|---|---|---|---|---|
| 1 | 23.5 | 1 | 10 | 11.0 |
| 2 | 22 | 1 | 10 | 10.6 |
| 3 | 22.5 | 1 | 13 | 10.3 |

Example 4

The standard drillirng fluid containing 30 kilograms of powdered sodium bentonite suspended in 350 liters of water was treated with an additive of the following composition: 85% leonardite, 10% potassium chloride and 5% sodium tripolyphosphate. The viscosity, gel strength and water loss data are presented in the following table:

| Weight of additive (kg.) | Viscosity (cp.) | Initial gel strength (grams) | 10-minute gel strength (grams) | Water loss (ml.) |
|---|---|---|---|---|
| 1 | 24 | 1 | 12 | 11.8 |
| 2 | 22.5 | 1 | 5 | 11.0 |
| 3 | 20.5 | 1 | 10 | 12.0 |

Example 5

To the standard drilling fluid (30 kilos of powdered sodium bentonite in 350 liters of water) was added a varying amount of a thinner composed of 85% leonardite, 10% potassium chloride and 5% sodium tripolyphosphate. The effects on viscosity and gel strength are shown in the following table:

| Weight of additive (kg.) | Viscosity (cp.) | Initial gel strength (grams) | 10-minute gel strength (grams) | Water loss (ml.) |
|---|---|---|---|---|
| 1 | 24.5 | 2 | 11 | 11.0 |
| 2 | 22.5 | 1 | 7 | 11.0 |
| 3 | 22.0 | 1 | 6 | 11.0 |

Example 6

The standard drilling fluid consisting of 30 kilos of pulverized sodium bentonite suspended in 350 liters of water was treated with an additive of the following composition: 83% leonardite, 10% potassium chloride and 7% sodium tripolyphosphate. Viscosity and gel strength data are presented in the following table:

| Weight of additive (kg.) | Viscosity (cp.) | Initial gel strength (grams) | 10-minute gel strength (grams) |
|---|---|---|---|
| 1 | 25 | 1 | 8 |
| 2 | 25 | 1 | 6 |
| 3 | 25 | 2 | 6 |

Example 7

The standard drilling fluid consisting of 30 kilograms of pulverized sodium bentonite suspended in 350 liters of water was treated wtih a thinner consisting of 80% leonardite, 10% potassium chloride and 10% sodium tripolyphosphate. Viscosity, gel strength and water loss data are presented in the following table:

| Weight of additive (kg.) | Viscosity (cp.) | Initial gel strength (grams) | 10-minute gel strength (grams) | Water loss (ml.) |
|---|---|---|---|---|
| 1 | 26 | 1 | 12 | 11 |
| 2 | 22 | 1 | 15 | 11 |
| 3 | 21.5 | 1 | 13 | 11 |

Example 8

The standard drilling fluid consisting of 30 kilograms of pulverized sodium bentonite suspended in 350 liters of water was treated with a thinner consisting of 85% leonardite, 10% sodium tripolyphosphate and 5% potassium sulfate. Viscosity, gel strength and water loss data are presented in the following table:

| Weight of additive (kg.) | Viscosity (cp.) | Initial gel strength (grams) | 10-minute gel strength (grams) | Water loss (ml.) |
|---|---|---|---|---|
| 1 | 25 | 1 | 3 | 11.2 |
| 2 | 24 | 1 | 7 | 11.0 |
| 3 | 24 | 1 | 8 | 10.9 |

Example 9

The standard drilling fluid consisting of 30 kilos of pulverized sodium bentonite suspended in 350 liters of water was treated with a thinner consisting of 85% leonardite, 10% sodium tripolyphosphate, 5% potassium chloride. The viscosity, gel strength and water loss data are given in the following table:

| Weight of additive (kg.) | Viscosity (cp.) | Initial gel strength (grams) | 10-minute gel strength (grams) | Water loss (ml.) |
|---|---|---|---|---|
| 1 | 22.5 | 1 | 4 | 12.0 |
| 2 | 22 | 1 | 4 | 11.2 |
| 3 | 21 | 1 | 4 | 11.2 |

*Example 10*

A drilling fluid containing 33 kilos of pulverized sodium bentonite suspended in 350 liters of water was tested for viscosity, gel strength as shown in the table below. Then hemlock bark extract was added and the changes in viscosity and gel strength are shown in the following table:

| Weight of additive (kg.) | Viscosity (cp.) | Initial gel strength (grams) | 10-minute gel strength (grams) |
|---|---|---|---|
| None | 75 | 58 | 96 |
| 1 | 43 | 5 | 23 |
| 2 | 40 | 3 | 23 |

*Example 11*

(a) The standard drilling fluid of 30 kilos of powdered sodium bentonite suspended in 350 liters of water was treated with 3 kilos of sodium leonardite admixed with 1% fatty acid diethanolamide. The resulting fluid had a viscosity of 32 centipoises and an initial gel strength of 2 grams.

(b) The same standard drilling fluid (see part a) was treated with 3 kilos of an iron chromium salt of lignin-sulfonic acid. The resulting fluid has a viscosity of 35 centipoises and an initial gel strength of 2 grams.

(c) The standard drilling fluid composed of 30 kilos of powdered sodium bentonite suspended in 350 liters of water was treated with a thinner of the following composition: 90% leonardite, 5% potassium chloride and 5% sodium tripolyphosphate. The resulting fluid had a viscosity of 22.5 centipoises, an initial gel strength of 0, a 10-minute gel strength of 1 gram and a water loss of 11:5 ml.

(d) The standard drilling fluid described above was treated with a thinner consisting of 85% leonardite and 15% potassium phosphate (monobasic). The resulting fluid had a viscosity of 30 centipoises and an initial gel strength of 2 grams.

(e) The standard drilling fluid described above was treated with a thinner consisting of 90% sodium leonardite and 10% potassium sulfate. The resulting fluid had a viscosity of 37 centipoises and an initial gel strength of 5 grams.

*Example 12*

The standard drilling fluid composed of 30 kilos of powdered sodium bentonite suspended in 350 liters of water was treated with an additive of the following composition: 80% leonardite, 10% sodium tripolyphophate and 10% potassium sulfate. The effect of the additive on viscosity, gel strength and water loss is shown in the following table:

| Weight of additive (kg.) | Viscosity (cp.) | Initial gel strength (grams) | 10-minute gel strength (grams) | Water loss (ml.) |
|---|---|---|---|---|
| 1 | 23 | 1 | 7 | 11.5 |
| 2 | 22 | 1 | 8 | 11.0 |
| 3 | 20 | 1 | 7 | 11.0 |

*Example 13*

The standard drilling fluid containing 30 kilos of powdered sodium bentonite suspended in 350 liters of water was treated with an additive of the following composition: 85% sodium leonardite, 10% sodium tripolyphosphate and 5% potassium ferricyanide. The effect of this additive on viscosity, gel strength and water loss is shown in the following table:

| Weight of additive (kg.) | Viscosity (cp.) | Initial gel strength (grams) | 10-minute gel strength (grams) | Water loss (ml.) |
|---|---|---|---|---|
| 1 | 24 | 0 | 1 | 11.3 |
| 2 | 24 | 0 | 1 | 10.8 |
| 3 | 21 | 0 | 1 | 10.8 |

*Example 14*

The standard drilling fluid consisting of 30 kilos of powdered sodium bentonite suspended in 350 liters of water was treated with a thinner composed of 97% sodium leonardite and 3% sodium tripolyphosphate. The effect of this thinner on viscosity, gel strength and water loss is shown in the following table:

| Weight of additive (kg.) | Viscosity (cp.) | Initial gel strength (grams) | 10-minute gel strength (grams) | Water loss (ml.) |
|---|---|---|---|---|
| 1 | 30 | 1 | 10 | 11 |
| 2 | 26 | 0 | 7 | 10.8 |
| 3 | 27 | 0 | 6 | 11 |

*Example 15*

The standard drilling fluid composed of 30 kilos of powdered sodium bentonite suspended in 350 liters of water was treated with an additive of the following formula: 85% leonardite and 15% sodium tripolyphosphate. The effect of this additive on viscosity, gel strength and water loss is shown below:

| Weight of additive (kg.) | Viscosity (cp.) | Initial gel strength (grams) | 10-minute gel strength (grams) | Water loss (ml.) |
|---|---|---|---|---|
| 1 | 27 | 1 | 1.5 | 11 |
| 3 | 30 | 1 | 1.5 | 10.6 |

*Example 16*

The standard drilling fluid composed of 30 kilos of powdered sodium bentonite suspended in 350 liters of water was treated with an additive consisting of 85% leonardite and 15% potassium sulfate. The effect of the additive on viscosity, gel strength and water loss is shown below:

| Weight of additive (kg.) | Viscosity (cp.) | Initial gel strength (grams) | 10-minute gel strength (grams) | Water loss (ml.) |
|---|---|---|---|---|
| 1 | 32 | 16 | 55 | 11.4 |
| 3 | 34 | 34 | 70 | 10.8 |

*Example 17*

The standard drilling fluid composed of 30 kilos of powdered sodium bentonite suspended in 350 liters of water was treated with an additive consisting of 85% leonardite and 15% potassium chloride. The effect of this additive on viscosity, gel strength and water loss is shown in the following table:

| Weight of additive (kg.) | Viscosity (cp.) | Initial gel strength (grams) | 10-minute gel strength (grams) | Water loss (ml.) |
|---|---|---|---|---|
| 1 | 35 | 20 | 40 | 11.8 |
| 3 | 35 | 40 | 80 | 12.0 |

What is claimed as new and is desired to be secured by Letters Patent of the United States is:

1. As a composition of matter useful in adjusting viscosity and gel strength of montmorillonite drilling fluids, the combination of 80% to 85% water-soluble leonardite, 5% to 10% water-soluble polyphosphate and 5% to 10% potassium salt of an inorganic acid.

2. A composition of matter as defined by claim 1 wherein the polyphosphate is an alkali metal polyphosphate.

3. A composition of matter as defined by claim 2 wherein the potassium salt is a salt of a mineral acid.

4. A composition as defined by claim 3 wherein the potassium salt is selected from the group consisting of potassium chloride and potassium sulfate.

5. A composition as defined by claim 4 wherein the alkali metal polyphosphate is sodium tripolyphosphate.

6. A composition of matter useful in adjusting viscosity and gel strength of montmorillonite drilling fluids comprising 80% to 85% alkali metal salt of leonardite, 5% to 10% alkali metal polyphosphate and 5% to 10% potassium salt selected from the group consisting of potassium chloride and potassium sulfate.

7. A composition of matter useful in adjusting viscosity and gel strength of montmorillonite drilling fluids comprising 80% to 85% alkali metal salt of leonardite, 5% to 10% alkali metal tripolyphosphate and 5% to 10% potassium salt selected from the group consisting of potassium chloride and potassium sulfate.

8. An aqueous montmorillonite drilling fluid containing an additive comprising 80% to 85% water-soluble leonardite, 5% to 10% water-soluble polyphosphate and 5% to 10% potassium salt of an inorganic acid, the amount of said additive being in the range of 2% to 20% of the weight of the montmorillonite in the drilling fluid.

9. An aqueous bentonite drilling fluid containing an additive comprising 80% to 85% water-soluble leonardite, 5% to 10% alkali metal polyphosphate and 5% to 10% potassium salt of an inorganic acid, the amount of said additive being in the range of 3% to 10% of the weight of the bentonite in the drilling fluid.

10. An aqueous bentonite drilling fluid as defined by claim 9, wherein the water-soluble leonardite is an alkali metal salt of leonardite and the potassium salt of an inorganic acid is selected from the group consisting of potassium chloride and potassium sulfate.

References Cited in the file of this patent

UNITED STATES PATENTS 2,211,688    Byck et al.    Aug. 13, 1940

FOREIGN PATENTS 803,544    Great Britain    Oct. 29, 1958

OTHER REFERENCES

Inukai: Oxidation of Lignite With Air or Dilute Nitric Acid, article in Chemical Abstracts, vol. 50, 1956, page 17,383.

Rogers: Composition and Properties of Oil Well Drilling Fluids, Rev. Ed., publ. 1953 by Gulf Publ. Co. of Houston, Tex., pages 310 to 313, 323 and 324.